July 29, 1941.   A. G. BUTLER   2,251,112
UNIVERSAL ATTACHMENT FITTING
Filed Feb. 7, 1939
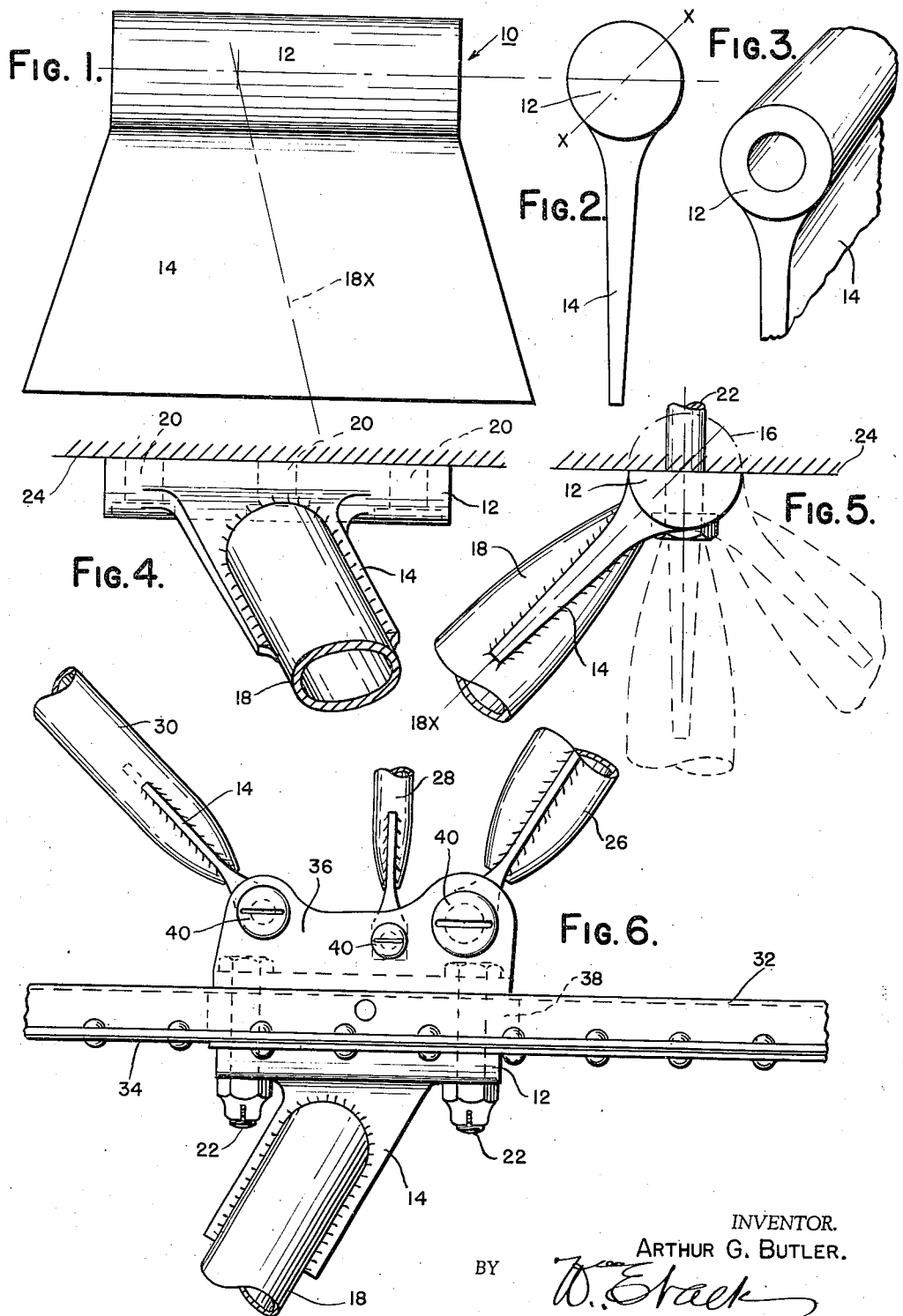
INVENTOR.
ARTHUR G. BUTLER.
BY
ATTORNEY.

Patented July 29, 1941

2,251,112

UNITED STATES PATENT OFFICE 2,251,112

UNIVERSAL ATTACHMENT FITTING

Arthur G. Butler, Buffalo, N. Y., assignor to Curtiss-Wright Corporation, a corporation of Delaware Application February 7, 1939, Serial No. 255,021

5 Claims. (Cl. 29—148)

This invention relates to structural joints and more particularly to a universal end fitting adapted for joining braces or struts to other structural parts.

The design and methods of securing strut ends to fastenings on various parts of an airplane has always been more or less complicated and costly. Strut ends were usually composed of several elements which constituted threaded yokes, or straps, or other parts all secured by bolts, rivets or welding, and then fastened to the structure by means of additional pins, bolts, or welding. Generally, such construction was not very clean aerodynamically and required an individual design for each strut end and fastening. Since the present trend is toward monoplane structure rather than multiplane, brace wires and struts have been, to a great extent, eliminated; however, much internal bracing as well as some external struts are still used and, due to the various changes in angularity at the points of attachment, it has been found difficult and expensive to detail and construct individual connections to suit the various angles met with.

Accordingly, as its principal object, this invention contemplates the provision of a universal end fitting for struts whereby the strut may be joined to another structural member so as to make any desired or required angle therewith. Under the present invention this is accomplished by using a universal end fitting which is so designed that it can be manufactured as a basic forging or rolled bar and when required for any particular installation, is then readily adapted by a supplementary machining operation to fit the particular angular requirements of the installation.

Another object of the present invention is to provide a universal end fitting which is of simplified design and will therefore be less bulky and require less space than the comparable types of joints now in use, and have a relatively high strength-to-weight ratio. Another object is to provide a strut end which is composed of but a single piece, and therefore is economically manufactured, and to provide a universal end fitting adaptable for all installations whereby the necessity of carrying a number of stock types is obviated.

Still another object is to provide a universal fitting which is alternately adaptable for use as an "eye" fitting.

The foregoing and additional objects of similar nature, which will be hereinafter more specifically treated, are accomplished by the means illustrated in the accompanying drawing in which:

Fig. 1 is a side elevation of the basic fitting according to this invention;

Fig. 2 is an end elevation of the fitting shown in Fig. 1;

Fig. 3 is a perspective view of a modified fitting;

Fig. 4 is a side elevation of a fitting adapted for a particular installation;

Fig. 5 is an end elevation of Fig. 4; and

Fig. 6 is a side elevation of a typical joint in which several of my novel connections are used.

In accomplishing the above objects, there is provided a basic fitting blank 10, as shown in Fig. 1, which is composed of two integral parts 12 and 14, the former being in the form of a solid metal cylinder to which is attached, or has formed thereon, the flat fin or tongue 14, extending radially of the cylinder. This fin 14 is preferably of an initial shape similar to that shown in Figs. 1 and 2. The cylinder and fin are preferably homogeneously formed into an integral universal blank fitting as by rolling, or extrusion processes in which cases it would be cut as required from relatively longer stock lengths. On the other hand it can be forged into the shape shown or a tapered plate fin can be welded to suitable rod stock.

The function of the cylindrical part 12 is to provide a flange for angular attachment to any suitable structural member to which it is desired to attach a brace or strut, while the function of the fin 14 is to provide a gusset plate for attachment of the strut to the fitting 10. The particular method of attachment of the strut to the fin is not a part of this invention; any suitable method may be employed but the method shown in the drawing is preferred. However, it is to be noted that the strut can be attached to the fin 14 so as to make almost any desired angle with the longitudinal axis of part 12 in the plane of the fin 14.

The fitting 10 can be mounted or attached to a structural part so that the fin 14 projects outward in any selected angle about the axis of portion 12. In addition the strut can be attached to the fin 14 at any angle in the plane thereof so that it is thus possible for the strut to have a resulting angular position with respect to its attachment which is a combination of the two angles.

Specifically, these angular adjustments are arrived at as follows: In the case of the cylindrical portion 12, once the desired angle has been determined, the bulb or cylinder 12 is machined down to the desired angular diameter such as indicated at x—x in Fig. 2. The result is then as shown in Fig. 5, that is there remains but half of the cylinder 12 and from this projects the fin 14 at whatever angle was selected. The dotted lines show various angular positions to which the strut can be adapted while the removed metal in each case is indicated by the dotted semicircle 16.

Referring now to both Figs. 4 and 5, it is shown how a typical strut 18 may be attached to the fin 14. The strut end is slit or notched across centrally of the tube so that it can be slipped on to the fin or gusset which it then embraces. After the strut is adjusted on the fin to the required angularity, as indicated by its axis 18x shown in Fig. 1, it may be welded into fixed relationship. After this operation the excess material of the fin, remote from the strut 18, may be cut away by machining to make the fitting neat and compact and reduce the weight of the connection.

In actual practice the strut 18 may either be attached to the fitting 10 before the cylindrical part 12 is machined to the correct angle, or after, as conditions may require. After the part 12 has been so machined, hole 20 in the desired diameter and number are then drilled through it so that the fitting 10 can be suitably attached, as by bolts 22, to the structure, as diagrammatically shown at 24 in Figs. 4 and 5.

In Fig. 6 is shown a typical structural joint, as might be used in aircraft construction, which consists of four struts 18, 26, 28 and 30, an inverted channel 32 serving as a wing rib, a lower wing skin 34, a bracket member 36 and an internal reinforcing block 38, all held together by the bolts 22 and suitable rivets as shown. The strut 18 is of the same construction and attachment method previously described. The struts 26, 28, 30 are also of similar construction and each includes the end fitting 10; however they are attached in a somewhat different manner. Instead of the portion 12 being machined at an angle, it is drilled along its axis as shown in Fig. 3 and thus is formed an elongated "eye" fitting which can be connected to a bracket such as 36 by means of bolts 40. Such an attachment would, of course, allow for pivotal movement about the axis of the attaching bolt.

It should be noted from Fig. 5 that the axis 18x of the strut 18 meets the surface to which the end fitting is attached at the center line of the bolts 22, thereby putting the bolts in shear and tension rather than bending. Obviously struts of other than tubular cross-section can also be advantageously connected by the novel fitting of this invention.

It is to be understood that the form of my invention herein shown and described is to be taken as a preferred example of the same, and that certain changes in the shape, size and arrangement of parts may be resorted to without departing from the spirit of the invention or the scope of the appended claims.

What I claim is:

1. The method of manufacturing a strut end fitting employing a stock blank having a solid cylindrical body portion and a projecting fin, which comprises the attaching of a strut to said fin in an angular relationship to said body, the trimming off of excess portions of said fin and the machining of a plane face on the surface of said body at a desired angle to the plane of said fin.

2. The method of manufacturing a strut end fitting employing a stock blank having a substantially solid bulbous body portion and a projecting fin, which comprises the attaching of a strut to said fin in an angular relationship to said body, the removal of excess portions of said fin and the formation of a mounting surface on the said body portion whereby the said fitting may be attached to a structural member with the fin in an angular relationship thereto.

3. An end fitting comprising a substantially solid bulbous body portion adapted for direct attachment to a plane-surfaced structural member and a fin projecting from the curved surface thereof, the said fin being adapted for the attachment of a second structural member thereto at an angle to the axial center line of said body portion.

4. The method of manufacturing a strut end fitting employing a stock blank having a substantially solid bulbous body portion and an attached fin, which comprises the attaching of a strut to said fin, the removal of excess portions of said fin and the formation of a mounting surface as part of the said body portion by a machining operation whereby said fitting is adapted to be attached to a structural member with the fin in an angular relationship thereto.

5. In a structural joint, the combination of two or more structural members to be joined and means of joinder comprising a fitting formed with a part-cylindrical solid body portion and a projecting fin, the said fin projecting from the cylindrical surface of said body portion to afford means of attachment to one of said structural members and the said body portion having an attaching surface machined thereon conforming to a local portion of the surface of the remaining structural member and means for joining the two surfaces as a structural unit.

ARTHUR G. BUTLER.